July 14, 1964 L. R. DAVIDSON 3,140,635
FASTENING MEANS FOR FAUCET HANDLE
Filed May 4, 1962
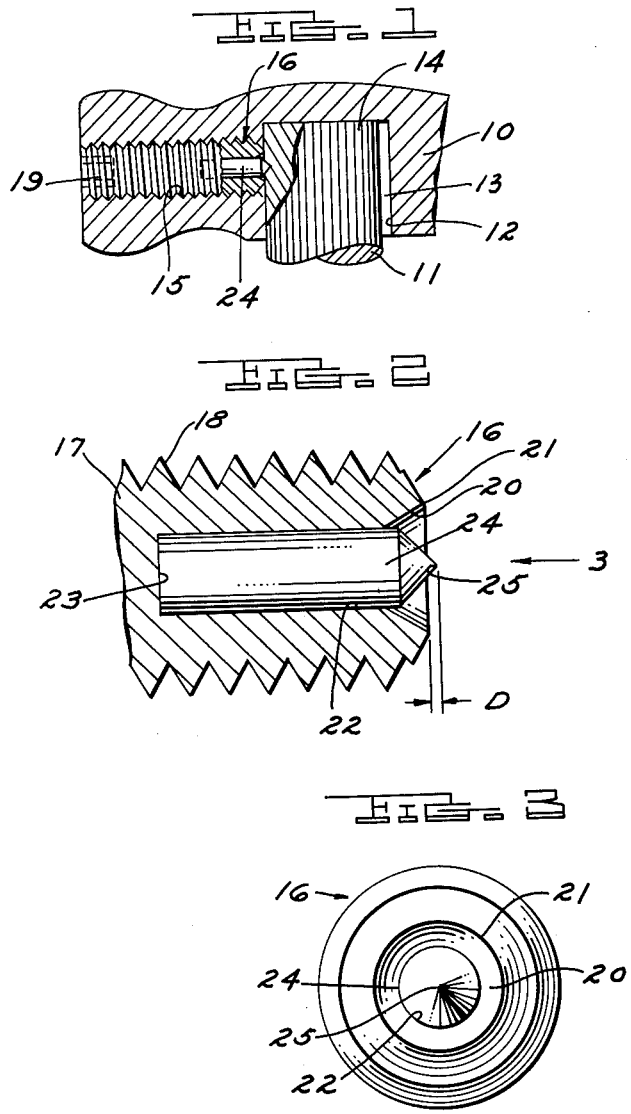
INVENTOR.
LEO RICHARD DAVIDSON
BY
Barnes, Kisselle, Raisch & Choate
ATTORNEYS

United States Patent Office 3,140,635
Patented July 14, 1964

3,140,635
FASTENING MEANS FOR FAUCET HANDLE
Leo Richard Davidson, 400 Norwood Ave., Sturgis, Mich.
Filed May 4, 1962, Ser. No. 192,592
3 Claims. (Cl. 85—1)

This invention relates to faucet handle constructions and particularly to an improved set screw for holding a faucet handle in position.

In a conventional faucet handle construction, the stem of the faucet extends into an opening in the handle and a set screw is used to hold the handle fixed to the stem. The end of the set screw is formed with an inwardly extending cup defining an annular ridge or edge which engages the stem when the set screw is threaded inwardly.

It is an object of this invention to provide an improved faucet handle construction incorporating a novel set screw providing for better anchorage without undue force, thereby resulting in a safer fastening of the handle to the stem.

It is a further object of the invention to provide an improved set screw construction.

Basically, the invention comprises providing a rotatably mounted insert in the end of the set screw, the insert having a point which engages and penetrates the stem first when the set screw is threaded inwardly. Subsequent rotation of the set screw causes it to rotate relative to the insert and thereafter causes the annular ridge or edge on the end of the set screw to engage and lock against the stem.

In the drawings:

FIG. 1 is a part sectional elevation of a faucet handle construction embodying the invention.

FIG. 2 is a sectional view of the set screw utilized in the faucet handle of FIG. 1.

FIG. 3 is an end view taken in the direction of the arrow 3 in FIG. 2.

Referring to the drawings, the faucet handle 10 is adapted to be mounted on the stem 11 of the faucet, with the end of the stem 11 extending into an opening 12 in the handle 10. The opening 12 is preferably provided with converging flat faces 13. The end of the stem is knurled or serrated as at 14. Diametrically opposite the faces 13, there is provided a threaded opening 15 into which the set screw 16 extends.

As shown in FIGS. 2 and 3, the set screw 16 comprises a conventional Allen head body 17 having threads 18 on the periphery which are adapted to engage the threads in the opening 15, an Allen head end 19 and a cylindrical opening 22 having a flat base 23 is provided in the end of the set screw and a hardened insert 24, which is cylindrical in shape, is inserted in the opening 22, the end 25 of the insert forming a centrally located point. The end 25 extends beyond the edge 21 of the set screw a distance D, which may be on the order of 0.035 inch. Opening 22 is preferably formed by drilling and reaming. Satisfactory results have been achieved by making the insert 24 of heat treated steel.

In mounting the handle on the stem, the set screw is threaded inwardly, causing the point 25 to engage the stem 11. Subsequent rotation of the set screw 16 causes the body 18 to rotate about the insert 24 bringing the annular edge 21 into locking engagement with the periphery of the end of the stem 11. This effectively locks the handle in position. In order to facilitate the handling of the set screw, the inserts 24 are submerged in oil prior to placement in opening 22 so that a layer of oil retains each insert 24 in the set screw prior to assembly.

Thus, when the set screw is initially threaded inwardly, the point 25 first engages the stem 11 and further rotation of the body 18 occurs relative to the insert 24 until the annular edge 21 engages and locks against the stem.

Tests of the improved set screw construction have shown that the anchorage of the handle is substantially increased over an ordinary cup pointed Allen head set screw. For example, torque wrench tests indicate that a conventional construction failed at 6 ft. lbs. as contrasted to the improved construction which failed at 18 ft. lbs. for set screws of 1/4" diameter by 3/4" length, utilized in fastening a 3/8" stem in a 1/2" hole.

Similar tests on steel show that a conventional set screw failed at 12 ft. lbs. and the improved set screw failed at 25 ft. lbs.

Moreover, it has been found that the improved set screw construction does not require any more pressure on the wrench to instal, or set, than is required on a conventional type of set screw.

It can thus be seen that I have provided a novel set screw construction that is particularly adapted for faucet handles, but which can be used to provide additional holding power beyond the capacity of conventional set screws.

I claim:

1. A set screw having a threaded periphery and adapted to be threaded into a first member with the inner end thereof engaging and holding a second member,
   said set screw having an axial cylindrical opening in said inner end,
   an insert having a bearing fit with said opening and rotatably mounted in said end of said opening in said set screw,
   one end of said insert rotatably engaging the base of said axial opening,
   the other end of said insert extending beyond said end of said set screw,
   said insert having a centrally located point,
   said set screw having an annular V-shaped edge surrounding said point,
   such that when said set screw is threaded inwardly relative to a said first member into a second member, the point on the end of said insert first engages said second member and the set screw thereafter rotates relative to said insert and the annular edge engages said second member.

2. The combination set forth in claim 1 wherein the distance between the end of the point of said insert and said annular edge axially of said screw is approximately 0.035 inch.

3. The combination set forth in claim 1 including a layer of oil interposed between said cylindrical opening and said rotatably mounted insert for holding said insert in position prior to assembly.

References Cited in the file of this patent

UNITED STATES PATENTS

| | | |
|---|---|---|
| 1,107,177 | Noble | Aug. 11, 1914 |
| 1,523,932 | Davies | Jan. 20, 1925 |
| 2,305,099 | Morris | Dec. 15, 1942 |
| 2,646,780 | Bethke | July 28, 1953 |
| 2,907,245 | Whitson | Oct. 6, 1959 |
| 2,917,331 | Baer et al. | Dec. 15, 1959 |
| 2,935,896 | Simon | May 10, 1960 |